United States Patent Office 3,431,675
Patented Mar. 11, 1969

3,431,675
RECLAIMING SALINE SOILS
David E. Moore, Tulsa, Okla.
(Box 351, Palacios, Tex. 77465)
No Drawing. Filed Mar. 10, 1965, Ser. No. 429,115
U.S. Cl. 47—58  2 Claims
Int. Cl. A01b 79/02

ABSTRACT OF THE DISCLOSURE

Process for reclaiming soils high in mineral content which comprises contacting said soils with aqueous solutions of micro-organisms produced by a digestion treatment of animal excrement in water to elute micro-organisms therefrom followed by a series of micro-organisms propagation-dilution steps.

---

This invention relates to the reclamation of saline and brackish waters.

More particularly this invention relates to a method of converting waste waters having high mineral content into water suitable for use in the irrigation of farm lands and for reclaiming soils having high mineral content. Further, water reclaimed according to the instant invention is suitable for use as drinking water for domestic animals, farm stock and the like and for wild animal life. Also, water reclaimed herein is useful for fish ponds, artificial lakes, water reservoirs and the like. Additionally, demineralized water produced by the instant process is very beneficial for use in chemical processes and other industrial operations, e.g., in many hydrolyses, in boilers, cooling towers, spray systems and the like, particularly when water of low mineral content and toxicity is desired or required.

Another and more important aspect of this invention is the conversion of saline and brackish waters into water suitable for human consumption.

The problem of polluted streams and watersheds, diminishing underground water supplies, together with increased demands for growing populations and industries, has made it imperative that means be found to replenish these supplies and to reclaim waste waters. Accordingly, many and varied attempts have been made to convert saline and brackish waters to fresh water. However, the conversion of salt water to potable water or water suitable for irrigation and soil conditioning purposes is often extremely expensive and many methods are ineffective. Although some current methods for converting saline waters have been used with some success, still, governmental, industrial and private research organizations are investing vast sums of capital, effort and time to discover and develop water reclaiming methods which are effective yet inexpensive. For example, the Office of Saline Water initiated a program of fundamental research in 1961 into the problem of salt water conversion. Among the various methods of separation and purification used by OSW and others in their conversion research are the vapor processes of distillation and evaporation. Liquid separation systems include reverse osmosis, electrodialysis, solvent extraction, controlled diffusion, and membrane permeation. Solid separation procedures include freezing, use of hydrates, ion exchange and adsorption. Biological systems and energy sources have also been investigated.

Related to the problem of saline water conversion to produce potable water is the problem of reclaiming agricultural land having high mineral content or tending to develop same by reason of salty water. With the human population increasing rapidly, a heavier demand is put upon the available agricultural land to furnish the food supply. Not only do many of these lands need to be conditioned or reconditioned, but heretofore non-arable lands need to be developed for agricultural as well as urban use.

As mentioned above, the pollution of streams, watersheds and other sources of water results in a severe depletion of water useable or readily rendered useful for drinking purposes, irrigation, soil conditioning and other industrial and agricultural purposes. As example of sources of pollution might be mentioned the discharge of waste waters from industrial and manufacturing plants, e.g., chemical operations and oil well operations. Of particular interest to the oil industry is the desalinization of waste waters, particularly salt waters, resulting from oil field operations. Governmental regulations are strict in regard to the disposal of these waste waters.

The problems of saline water and soil reclamation have been made the objects of international cooperation in efforts to solve these problems.

Accordingly, it is an object of this invention to provide a means for reclaiming saline and brackish waters.

It is a primary object of this invention to convert saline and brackish waters into water suitable for human consumption.

A further object of the invention is to provide reclaimed water suitable for irrigation of agricultural land and soil reclamation or conditioning.

Another object of the invention is to provide a saline water conversion system that is economically operated, simple and suitable for use in batch or continuous operation.

These and other objects will become apparent as the description proceeds.

According to the present invention it has been discovered that certain micro-organisms have an astounding ability to deplete the mineral concentration in saline waters. In particular, it has been found that animal excretion when soaked and partially decomposed in aqueous solution during a sufficient induction period provides a source of micro-organisms, including algae and bacteria, which when added to saline or brackish waters, preferably in the upper region of a contact zone, act upon or react with the mineral content of the saline or brackish water. Animal excreta of particular utility herein includes that of ruminant variety. As the solids and semisolids content of the reaction mixture filters downwardly, a residue or slurry of this material and some of said micro-organisms is built up in a settling zone in the lower region of the said contact zone. Portions of this slurry are combined, preferably continuously, with the micro-organisms, first contacted with the saline or brackish water in a feed reservoir situated preferably above or near the upper region of the said contact zone and this combined mixture of algae, bacteria and residue is recycled to said contact zone. The substantially desalinated water product is withdrawn from a region approximating the middle one-third of said contact zone. This product is now suitable for irrigation purposes and reclaiming soils having high mineral content, and hence, unsuitable or poorly suited to raising crops. This substantially desalted water is also highly suitable for use as commercial water in industrial utilities.

Alternatively, the water product, or any portion thereof, from said contact zone is suitably processed for human consumption and other utilities wherein low micro-organisms content is desired or required by passing said water through filtration means to remove taste, odor, color and suspended material and killing algae and bacteria, by various means, e.g., chlorination, ultraviolet light, etc.

By desalination, desalting or demineralization, as the terms are used herein is meant to refer to reductions in salt or mineral concentrations ranging downwardly from near the saturation level in water, i.e., from about 200–250 thousand parts per million (p.p.m.) to about 150 p.p.m., which is approximately the mineral content in the average municipal drinking water systems. Saline water solutions having different salt or mineral concentrations will when treated according to this invention under the same conditions, result in varying concentrations of mineral content. However, it is understood that when saline or brackish water streams having difficult mineral concentrations are to be treated according to the instant invention, various operating adjustments will be made, such as increasing or decreasing the concentration of the aqueous solution of micro-organisms used, increasing or decreasing the circulation rate of said slurry residue, warming the contact zone, diluting the saline stream, e.g., with some of the desalinized water and other modifications which occur to those skilled in the art.

The example which follows is by way of illustration only and not by way of limitation.

*Example*

To a concrete vessel of approximately 165 gallon capacity is introduced 150 gal. of fresh water of commercial purity. To this water is added 200 pounds of cure-dried cow excrement (manure). This mixture is allowed to set for a period from 12 to 14 days to soak and partially decompose said excrement. If desired, this soaking and decomposition period can be reduced by use of yeast or other suitable catalyst, which accelerates the decomposition. Sometime between the 12th and 14th days, the specific time depending upon the temperature and/or catalytic effect, the residue of said excrement will rise to the surface of the water from which it is removed and discarded. At this time the water solution remaining in the concrete vessel has a brownish color and contains micro-organisms eluted or soaked out of the cure-dried cow excrement starting material. One-hundred gallons of cultured water from the concrete soaking vessel is transferred to a second vessel of about 1,000 gal. capacity and fresh water added to achieve a ratio of about 10 parts water to 1 part cultured water. At this time additional excrement, i.e., about 130 pounds (one-third of the original amount) is added to said concrete vessel and the vessel again filled. The first and second vessels are both allowed to set for 12–14 days more, wherein the reaction in the first vessel repeats its above-described performance and in the second vessel algae are formed on the inside of the vessel and on the surfaces of various objects placed in this vessel for algae formation on wide area surfaces. Next, 100 gal. of diluted cultured water from the second vessel is transferred to a third vessel of about 1,000 gal. capacity which is then filled with fresh water. To the second vessel is then added about 90 gal. of fresh water and about 10 gal. of cultured water from the first vessel. Said second and third vessels can be ordinary steel tanks. To the first vessel is then added about 9 gal. of fresh water and about one gallon of excrement for soaking and decomposition, as previously. At this time the process is ready for continuous operation. The first vessel is now substantially all cultured with micro-organisms, including bacteria and algae; the last added one gallon of excrement will now completely decompose and yield more micro-organisms in about one day.

In operation one hundred gallons of the product from the third vessel is placed in the aforementioned settling zone in the lower region of the contact zone for saline and brackish waters and the micro-organisms. Said settling zone can be a part of the contacting zone reduced in size or a separate vessel, e.g., a smaller tank. To the contact zone, which can also be a steel water tank is then added about 1,000 gals. of saline water. Next, about 50 gals. of cultured water from the third vessel is added to the above-mentioned feed reservoir for said micro-organisms. Said reservoir can be steel tanks or a part of the contacting zone itself. The said saline water and cultured water in said settling zone is then allowed to stand for about 72 hours during which time said micro-organisms, including algae, are allowed to germinate on the walls of said contacting zone.

After about 72 hours has elapsed, a submersible pump situated in said settling zone is turned on and pumps some of the residue in said settling zone into said micro-organisms feed reservoir from which a feed stream of cultured water containing said micro-organisms is introduced into said contacting zone by an overflow pipe. At this point a stream of saline water to be treated and containing about 10,000 p.p.m. salt is introduced into said contacting zone wherein said micro-organisms attack and reduce the salt content to about 200 p.p.m. The desalted water is removed from said contacting zone through a pipe located at a place near the middle region of the contacting zone.

The desalted water as removed from said contacting zone has been successfully used to irrigate farm lands growing alfalfa, lettuce, wheat, carrots, onions, potatoes, canteloupes, watermelon and the like. It has also been successfully used to irrigate flower growing soils for roses, gladiolas, gardenias, croton plants and the like. This desalted water has also been successfully used to recondition soils rich in chlorides to low levels.

In another embodiment of the invention the desalted water from the contacting zone was run through an activated charcoal filter to remove odor and taste; then through an ultraviolet purifier to kill bacteria, algae and virus. From the ultraviolet purifier the desalted water was then passed through a sand core filter by means of a centrifugal pump with the sand core filter (and U.V. purifier and charcoal filter also) on the vacuum side. The desalted and purified water was potable for human consumption and also useful for industrial purposes.

The above embodiments were conducted under conditions of standard temperature and pressure.

It will be understood by those skilled in the art that various modifications may be made without departing from the spirit and scope of the instant invention.

I claim:
1. Process for reclaiming soils high in mineral content which comprises contacting said soils with aqueous solutions of micro-organisms produced by:
  (a) contacting animal excrement with water in a soaking zone for a period of time sufficient to decompose said excrement and elute micro-organisms therefrom as indicated by solid residue thereof rising to the surface of the water from which said residue is removed;
  (b) transferring a major portion of the culture water containing micro-organisms eluted from said excrement in step (a) to a second zone wherein fresh water is added in excess of that transferred from said soaking zone and allowing this mixture to stand for the period of time recited in step (a), during which time algae grow therein;
  (c) replenishing said soaking zone with additional water and excrement and repeating step (a);
  (d) transferring a minor portion of the culture water from said second zone in step (b) to a third zone wherein fresh water is added in excess of that transferred from said second zone and replacing said transferred minor portion from said second zone with a minor portion of culture water from said soaking zone and fresh water in excess thereof;
  (e) replenishing said soaking zone with additional excrement and water in excess thereof and repeating step (a);
  (f) transferring a first minor portion of the culture water mixture from said third zone in step (d) to a settling region of a fourth zone to which is added a quantity of saline water, transferring a second lesser minor portion of the culture water mixture from said third zone to a micro-organisms culture feed reservoir for said fourth zone and contacting said first minor portion and said saline water for a period of time to germinate micro-organisms in said four zone;

(g) thereafter transferring a portion of the residue from said settling region to said feed reservoir the overflow of which is then contacted with a stream of saline water introduced into said fourth zone for desalinization and;

(h) contacting the effluent product from said fourth zone with soil to be reclaimed.

2. Process according to claim 1 wherein:

(a) the soaking and contact period recited in steps (a)–(c) in said soaking zone and said second zone is about 12–14 days;

(b) the ratios of excess fresh water in said second and third zones and saline water in said fourth zone to said minor portions of culture water therein is approximately 10:1 and (c) said period of time in step (f) to germinate micro-organisms in said fourth zone is approximately 72 hours.

References Cited

UNITED STATES PATENTS 2,908,113  10/1959  Martin _____ 47—58

OTHER REFERENCES

Levin, G. V., et al., Biological Membranes, Appearing in Saline Water Conversion Report for 1957, U.S. Dept. of Interior, Washington, pp. 50 and 53.

WILLIAM E. ROGERS, *Primary Examiner.*

U.S. Cl. X.R.

47—1.4; 71—9; 210—4, 11